(12) United States Patent
Wynn et al.

(10) Patent No.: US 9,017,451 B2
(45) Date of Patent: Apr. 28, 2015

(54) MEMBRANE-BASED GAS SEPARATION PROCESS USING EJECTOR-DRIVEN GAS RECYCLE

(75) Inventors: Nicholas P. Wynn, Redwood City, CA (US); Haiqing Lin, Mountain View, CA (US); Meijuan Zhou, Fremont, CA (US); Jennifer H. Ly, San Jose, CA (US); Adrian Serbanescu-Martin, San Jose, CA (US); Livia Serbanescu-Martin, legal representative, San Jose, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 216 days.

(21) Appl. No.: 13/422,344

(22) Filed: Mar. 16, 2012

(65) Prior Publication Data
US 2013/0239804 A1 Sep. 19, 2013

(51) Int. Cl.
*B01D 53/22* (2006.01)
*B01D 53/047* (2006.01)
*B01D 53/14* (2006.01)

(52) U.S. Cl.
CPC ............ *B01D 53/229* (2013.01); *B01D 53/047* (2013.01); *B01D 53/14* (2013.01); *B01D 53/226* (2013.01); *B01D 2256/245* (2013.01)

(58) Field of Classification Search
CPC .............................. B01D 53/228; Y02C 10/10
USPC ......................................... 95/43–56; 96/4–14
See application file for complete search history.

(56) References Cited

U.S. PATENT DOCUMENTS

| | | | | |
|---|---|---|---|---|
| 3,339,341 A | * | 9/1967 | Maxwell et al. | 95/53 |
| 3,927,981 A | * | 12/1975 | Viannay et al. | 422/48 |
| 4,264,338 A | * | 4/1981 | Null | 95/47 |
| 4,370,150 A | * | 1/1983 | Fenstermaker | 95/49 |
| 4,654,047 A | | 3/1987 | Hopkins et al. | |
| 4,772,295 A | | 9/1988 | Kato et al. | |
| 4,863,492 A | | 9/1989 | Doshi et al. | |
| 4,983,301 A | * | 1/1991 | Szucz et al. | 210/636 |
| 5,089,033 A | | 2/1992 | Wijmans | |
| 5,129,921 A | * | 7/1992 | Baker et al. | 95/45 |
| 5,161,385 A | * | 11/1992 | Schumacher | 62/127 |
| 5,199,962 A | | 4/1993 | Wijmans | |
| 5,256,295 A | | 10/1993 | Baker et al. | |
| 5,281,253 A | * | 1/1994 | Thompson | 95/22 |
| 5,441,821 A | * | 8/1995 | Merritt et al. | 429/410 |
| 5,698,011 A | * | 12/1997 | Chung et al. | 95/45 |
| 6,161,397 A | | 12/2000 | McNeil et al. | |
| 6,183,628 B1 | | 2/2001 | Baker et al. | |

(Continued)

OTHER PUBLICATIONS

Nice et al. "How Fuel Cells Work" <http://www.howstuffworks.com/fuel-efficiency/alternative-fuels/fuel-cell2.htm/printable> 6 pages Oct. 3, 2014.*

*Primary Examiner* — Jason M Greene
*Assistant Examiner* — Anthony Shumate
(74) *Attorney, Agent, or Firm* — Timothy A. Hott; Janet Farrant; Kathi Bean

(57) ABSTRACT

A gas separation process that utilizes ejector recycle with a membrane separation step in combination with a second separation step. The second separation step may be a second membrane separation, or may involve a different type of separation process. At least a portion of the non-product (i.e. residue) stream withdrawn from the second separation step is directed back to the ejector to form a processing loop. The ejector drives the gas flow in the loop and recycles the non-product stream to the first separation step.

1 Claim, 9 Drawing Sheets

(56) References Cited

U.S. PATENT DOCUMENTS

| | | | |
|---|---|---|---|
| 6,197,090 B1* | 3/2001 | Yamashita et al. | 95/12 |
| 6,350,371 B1* | 2/2002 | Lokhandwala et al. | 208/134 |
| 6,572,679 B2 | 6/2003 | Baker et al. | |
| 6,630,011 B1 | 10/2003 | Baker et al. | |
| 7,309,537 B2* | 12/2007 | Blaszczyk et al. | 429/415 |
| 8,114,191 B2* | 2/2012 | Rabiei | 95/4 |
| 8,591,739 B2* | 11/2013 | Johnson et al. | 210/636 |
| 2002/0022171 A1* | 2/2002 | Saito et al. | 429/34 |
| 2003/0157383 A1* | 8/2003 | Takahashi | 429/22 |
| 2003/0180599 A1* | 9/2003 | Kamihara | 429/34 |
| 2005/0244686 A1* | 11/2005 | Kamihara | 429/22 |
| 2007/0084791 A1* | 4/2007 | Jordan et al. | 210/608 |
| 2007/0099037 A1* | 5/2007 | Senner | 429/17 |
| 2009/0035618 A1* | 2/2009 | Brighton et al. | 429/17 |
| 2009/0155641 A1* | 6/2009 | Senner et al. | 429/17 |
| 2010/0147148 A1* | 6/2010 | Rabiei | 95/247 |
| 2012/0000642 A1* | 1/2012 | Betzer Tsilevich | 166/57 |
| 2013/0255483 A1* | 10/2013 | Sanders et al. | 95/8 |

* cited by examiner

MEMBRANE-BASED GAS SEPARATION PROCESS USING EJECTOR-DRIVEN GAS RECYCLE

FIELD OF THE INVENTION

The invention relates to membrane-based gas separation. In particular, the invention relates to separation processes that use two or more separation steps, including at least one membrane separation step, where the steps operate in a loop, and an ejector is used to drive recirculation of gas within the loop. The process of the invention uses membrane separation to obtain a high-recovery and high-purity product, without the need for using a lot of compression power.

BACKGROUND OF THE INVENTION

Membrane separation is used in various industries, for example, to remove contaminants from a gas mixture, or to recover components of value. Simple, one-step membrane processes are useful for achieving bulk separations, but are less useful when high levels of removal and recovery are desired. In such cases, multiple similar or dissimilar separation steps are often needed, and such combinations are familiar to the gas separation industry. For example, U.S. Pat. Nos. 5,089,033 and 5,199,962 describe combinations of condensation and membrane separation. U.S. Pat. Nos. 4,654,047 and 6,161,397 describe hybrid processes that use cryogenic and non-cryogenic separation steps. U.S. Pat. No. 4,772,295 describes processes using absorption in conjunction with membrane separation. U.S. Pat. Nos. 4,863,492 and 6,183,628 disclose methods for combining pressure swing adsorption (PSA) with membrane separation, and numerous patents, including U.S. Pat. Nos. 6,572,679 and 6,630,011, describe multi-step and multi-stage membrane separation processes. In the hybrid process, the membrane step or system may precede the non-membrane step or system, or vice versa.

In such processes, it is known to return the non-product stream from the second separation step to the inlet of the first step, to create a processing loop, thereby increasing product recovery. Some loss of gas pressure is inevitable as gas passes through the various unit operations, so the recycle gas has to be recompressed before it can re-enter the first separation step. This requires a recycle compressor to be included in the processing loop or, if there is a feed compressor upstream of the feed inlet to the first separation step, for the recycle gas to be passed again through the feed compressor. Either process consumes energy, thereby reducing the efficiency of the overall process. If a recycle compressor is needed, this adds to the capital costs and operating complexity of the process.

Thus, there remains a need for more energy-efficient and simple gas separation processes.

SUMMARY OF THE INVENTION

The invention relates to a hybrid gas separation process where at least one of the separation steps is a membrane separation process, and where the gas mixture consists of two or more gas components. (The term "gas component" is used herein to refer to either individual gas components or groups of related gas components.) The invention makes use of two separation steps: a membrane separation step and an "other component removal" step. In the membrane separation step, a gas mixture is passed over a semi-permeable membrane. The back (permeate) side of the membrane is maintained at a considerably lower pressure than the feed side; as a result, a portion of the gas mixture permeates the membrane.

The membrane area is selected so that only a fraction of the feed gas permeates the membrane. This fraction is termed the "stage cut", and the stream that permeates the membrane is termed the "permeate stream". The permeate stream is enriched in the component(s) that permeates that membrane more readily (the "fast" component(s)). The stream that does not permeate the membrane remains at pressure and is termed the "residue stream". The residue stream is depleted in the fast component(s) and enriched in the other component(s) (the "slow" component(s)).

In the membrane separation step described above, the fast component is partially removed from the gas stream. In the hybrid process that is the subject of this application, the "other component removal step" can be a membrane step using a different type of membrane or another type of separation process, for example, partial condensation, absorption, or pressure swing adsorption (PSA). The other component separation step must, however, exhibit all of the following characteristics:

The step must deplete the gas mixture in the component that is enriched in the residue from the membrane separation step (i.e., the slow component). This can be effected by selecting a membrane material that selectively permeates the component not removed in the other component removal step, or by selecting the other component removal step to remove the slow permeating component from the membrane removal step.

The step must constitute a flow-through step that leaves the residual gas essentially at the feed pressure. By "essentially at feed pressure", we mean that the pressure drop through the separation step is solely the result of frictional losses caused by the flow of the gas. If the feed gas flow decreases, the frictional pressure loss also decreases.

It must be a partial pressure-driven process, i.e., the amount of component removed from the mixture depends on the partial pressure of that component in the gas and, because of this, the process cannot remove all of the slow component from the gas.

An example of a flow-through process driven by partial pressure is partial condensation, where the feed gas is passed through a cooler and then through a phase separator. In this case, the slow component will be preferentially condensed and will be removed from the gas stream in the phase separator. More gas is condensed if the partial pressure of the slow component is higher than the partial pressure of the fast component.

Another example of a flow-through process driven by partial pressure is absorption, where gas is passed to a gas phase continuous contactor, fed with an absorbent gas that preferentially absorbs the slow component (from the first membrane separation step). In this case, the gas leaving the contactor is essentially at feed pressure (apart from frictional pressure losses) and is depleted in the slow component. More gas is absorbed if the partial pressure of the slow component is higher than the partial pressure of the fast component.

Yet another example of a flow-through process driven by partial pressure is pressure swing adsorption (PSA). In PSA, gas is passed over an adsorbent bed and one component is preferentially adsorbed. The gas stream exiting the adsorbent bed is essentially at feed pressure (apart from frictional pressure losses) and is depleted in the slow component. More gas is adsorbed if the partial pressure of the slow component is higher than the partial pressure of the fast component. The adsorbate gas is periodically removed from the adsorbent bed by depressurization.

Another exemplary flow-through process driven by partial pressure is a second membrane separation step, where the material comprising the second membrane is oppositely selective to the first membrane. In this case, the residue stream exiting the membrane is essentially at feed pressure (apart from frictional pressure losses) and is depleted in the slow component (from the first membrane step). More gas is removed if the partial pressure of the slow component is higher than the partial pressure of the fast component.

An example of a separation step that does not exhibit all of these characteristics would be an expansion turbine to cool a stream to effect partial condensation. In this case, the residual gas is not at essentially the feed pressure. Another example would be total condensation plus distillation. In this case, there is no flow-through of gas.

Specifically, the invention is a process for separating a gas mixture into two or more gas components. The process combines at least two individual separation steps, at least one of which is a membrane separation step that is selective to a first gas component relative to a second gas component, and the other separation step is selective to the second gas component relative to the first gas component. Non-product gas from the second step is recycled to the inlet of the first separation step in a processing loop. The process is characterized in that an ejector is used to recycle the non-product gas and drive the gas flow in the loop.

An ejector (also known as an injector or eductor) is a device that uses the Venturi effect of a converging-diverging nozzle to convert some of the pressure energy of a motive gas to velocity energy, which creates a low-pressure zone that draws in and entrains a suction gas. An ejector has no moving parts and therefore requires no mechanical drive.

FIG. 5 is a diagram of a typical ejector, 500, which consists of a motive gas inlet nozzle, 501, and a converging-diverging outlet nozzle, 502. A motive gas, 503—typically, air, steam, or any other gas at high pressure—provides the motive force at the inlet, 501. The motive gas, 503, is mixed with a suction gas, 504. After passing through the throat of the ejector, the velocity of the mixed gas is reduced, which results in recompressing the mixed gas by converting velocity energy back into pressure energy.

The Venturi effect—a particular case of Bernoulli's principle—applies to the operation of this device. Gas under high pressure is converted into a high velocity jet at the throat of the convergent-divergent nozzle, 502, which creates a low pressure at this point. The low pressure draws the suction gas, 504, into the convergent-divergent nozzle, 502, where it mixes with the motive gas.

In essence, some of the pressure energy of the inlet motive gas, 503, is converted to kinetic energy, in the form of velocity, at the throat of the convergent-divergent nozzle, 502. As the mixed gas expands in the divergent diffuser, 505, the kinetic energy is converted back into pressure energy at the diffuser outlet, 506, in accordance with Bernoulli's principle.

According to the process of the invention, a motive gas comprising a gas mixture that includes at least a first gas component and a second, different gas component is fed into the motive gas inlet of an ejector, and a suction gas is fed into the suction gas inlet. A mixed gas comprising the motive gas and the suction gas is withdrawn from the mixed gas outlet of the ejector. The mixed gas is then passed across the feed side of a membrane that is selective to the first gas component relative to the second gas component. A permeate stream that is enriched in the first gas component relative to the mixed gas is withdrawn from the permeate side of the membrane; a residue stream that is depleted in the first gas component relative to the mixed gas is withdrawn from the feed side of the membrane. The residue stream is then sent for further separation in a second separation process, which may be (for example and not by way of limitation) a condensation process, an absorption process, a pressure swing adsorption (PSA) process, or a second membrane separation process. At least a portion of the residue (i.e., non-product) stream from the second separation process is then routed back to the ejector as part of the suction gas.

A basic embodiment of the gas separation process of the invention comprises the following steps:

(a) providing an ejector including a motive gas inlet, a suction gas inlet, and a mixed gas outlet;

(b) passing to the motive gas inlet a motive gas comprising a gas mixture that includes at least a first gas component and a second gas component that is different from the first gas component;

(c) passing a suction gas to the suction gas inlet;

(d) withdrawing from the mixed gas outlet a mixed gas comprising the motive gas and the suction gas;

(e) providing a membrane having a feed side and a permeate side, wherein the membrane is selective to the first gas component relative to the second gas component;

(f) passing the mixed gas across the feed side;

(g) withdrawing from the permeate side a permeate stream that is enriched in the first gas component relative to the mixed gas;

(h) withdrawing from the feed side a residue stream that is depleted in the first gas component relative to the mixed gas;

(i) passing the residue stream to a second separation unit to perform a second separation step;

j) withdrawing from the second separation unit a non-product stream that is depleted in the second gas component relative to the residue stream; and (k) passing at least a portion of the non-product stream back to the ejector as the suction gas.

As discussed above, the second separation step must be a partial pressure-driven, flow-through step that leaves the residual gas essentially at the feed pressure.

A preferred embodiment of the process of the invention comprises the following steps:

(a) providing an ejector including a motive gas inlet, a suction gas inlet, and a mixed gas outlet;

(b) passing to the motive gas inlet a motive gas comprising a gas mixture that includes at least a first gas component and a second gas component that is different from the first gas component;

(c) passing a suction gas to the suction gas inlet;

(d) withdrawing from the mixed gas outlet a mixed gas comprising the motive gas and the suction gas;

(e) providing a membrane having a feed side and a permeate side, wherein the membrane is selective to the first gas component relative to the second gas component;

passing the mixed gas across the feed side;

(g) withdrawing from the permeate side a permeate stream that is enriched in the first gas component relative to the mixed gas;

(h) withdrawing from the feed side a residue stream that is depleted in the first gas component relative to the mixed gas;

(i) passing the residue stream to a partial condenser;

(j) withdrawing from the partial condenser an overhead gas stream that is depleted in the second gas component relative to the residue stream; and (k) passing at least a portion of the overhead gas stream back to the ejector as the suction gas.

Another preferred embodiment of the process of the invention comprises the following steps:

(a) providing an ejector including a motive gas inlet, a suction gas inlet, and a mixed gas outlet;

(b) passing to the motive gas inlet a motive gas comprising a gas mixture that includes at least a first gas component and a second gas component that is different from the first gas component;

(c) passing a suction gas to the suction gas inlet;

(d) withdrawing from the mixed gas outlet a mixed gas comprising the motive gas and the suction gas;

(e) providing a membrane having a feed side and a permeate side, wherein the membrane is selective to the first gas component relative to the second gas component;

(f) passing the mixed gas across the feed side;

(g) withdrawing from the permeate side a permeate stream that is enriched in the first gas component relative to the mixed gas;

(h) withdrawing from the feed side a residue stream that is depleted in the first gas component relative to the mixed gas;

(i) passing the residue stream to an absorption unit;

(j) withdrawing from the absorption unit an overhead gas stream that is depleted in the second gas component relative to the residue stream; and (k) passing at least a portion of the overhead gas stream back to the ejector as the suction gas.

Yet another preferred embodiment process comprises the following steps:

(a) providing an ejector including a motive gas inlet, a suction gas inlet, and a mixed gas outlet;

(b) passing to the motive gas inlet a motive gas comprising a gas mixture that includes at least a first gas component and a second gas component that is different from the first gas component;

(c) passing a suction gas to the suction gas inlet;

(d) withdrawing from the mixed gas outlet a mixed gas comprising the motive gas and the suction gas;

(e) providing a first membrane having a first feed side and a first permeate side, wherein the first membrane is selective to the first gas component relative to the second gas component;

(f) passing the mixed gas across the first feed side;

(g) withdrawing from the first permeate side a first permeate stream that is enriched in the first gas component relative to the mixed gas;

(h) withdrawing from the first feed side a first residue stream that is depleted in the first gas component relative to the mixed gas;

(i) providing a second membrane having a second feed side and a second permeate side, wherein the second membrane is selective to the second gas component relative to the first gas component;

(j) passing the first residue stream across the second feed side;

(k) withdrawing from the second permeate side a second permeate stream that is enriched in the second gas component relative to the first residue stream;

(l) withdrawing from the second feed side a second residue stream that is depleted in the second gas component relative to the first residue stream; and (m) passing at least a portion of the second residue stream back to the ejector as the suction gas.

A fourth preferred embodiment process comprises the following steps:

(a) providing an ejector including a motive gas inlet, a suction gas inlet, and a mixed gas outlet;

(b) passing to the motive gas inlet a motive gas comprising a gas mixture that includes at least a first gas component and a second gas component that is different from the first gas component;

(c) passing a suction gas to the suction gas inlet;

(d) withdrawing from the mixed gas outlet a mixed gas comprising the motive gas and the suction gas;

(e) providing a membrane having a feed side and a permeate side, wherein the membrane is selective to the first gas component relative to the second gas component;

(f) passing the mixed gas across the feed side;

(g) withdrawing from the permeate side a permeate stream that is enriched in the first gas component relative to the mixed gas;

(h) withdrawing from the feed side a residue stream that is depleted in the first gas component relative to the mixed gas;

(i) passing the residue stream to a pressure swing adsorption unit;

(j) withdrawing from the pressure swing adsorption unit a residue gas stream that is depleted in the second gas component relative to the residue stream; and (k) passing at least a portion of the residue gas stream back to the ejector as the suction gas.

In an alternative embodiment of the invention, the membrane separation step is performed following a first separation step, which may be (for example and not by way of limitation) a condensation process, an absorption process, or a pressure swing adsorption (PSA) process. This embodiment comprises the following basic steps:

(a) providing an ejector including a motive gas inlet, a suction gas inlet, and a mixed gas outlet;

(b) passing to the motive gas inlet a motive gas comprising a gas mixture that includes at least a first gas component and a second gas component that is different from the first gas component;

(c) passing a suction gas to the suction gas inlet;

(d) withdrawing from the mixed gas outlet a mixed gas comprising the motive gas and the suction gas;

(e) passing the mixed gas to a first separation step;

(f) withdrawing from the first separation step a product stream that is enriched in the first gas component relative to the mixed gas;

(g) withdrawing from the first separation step a non-product stream that is depleted in the first gas component relative to the mixed gas;

(h) providing a membrane having a feed side and a permeate side, wherein the membrane is selective to the second gas component relative to the first gas component;

(i) passing the non-product stream across the feed side;

(j) withdrawing from the permeate side a permeate stream that is enriched in the second gas component relative to the non-product stream;

(k) withdrawing from the feed side a residue stream that is depleted in the second gas component relative to the non-product stream; and (l) passing at least a portion of the residue stream back to the ejector as the suction gas.

The process of the invention is particularly effective when the total stage cut through the two (or more) separation steps is at least 40%, and is preferably at least 50-60%. As used herein, the term "stage cut" refers to the mass of the total product stream from both separation steps divided by the mass of the gas stream from the ejector, as indicated by the following formula:

$$\frac{\text{Total Product Stream (wt \%)}}{\text{Gas Stream from Ejector (wt \%)}}$$

In other words, when the stage cut is 50%, this means that 50 wt % of the feed stream is recovered as product, and 50 wt % is recycled back to the ejector as the suction gas. Therefore, the higher the stage cut, the smaller the recycle stream back to the ejector.

The processes of the invention are useful in a wide number of gas separation applications including, but not limited to, treatment of natural gas streams, such as to remove excess hydrocarbons, nitrogen or carbon dioxide; treatment of refinery off-gases to recover hydrogen or light hydrocarbons; and treatment of process and off-gas streams related to diverse petrochemical processes, such as to recover feedstocks or remove contaminants.

The processes of the invention have a number of advantages over prior art processes that rely on a compressor to repressurize and drive gas flow in the recycle loop. In particular, the processes of the invention replace rotating equipment with a simple, passive device that has no moving parts and that requires no external energy source. As a result, the complexity and capital costs of the equipment used to carry out the process are reduced, maintenance needs are simplified, and energy consumption and, hence, operating costs are likely to be lower.

Also disclosed herein is an apparatus for separating a gas mixture into two or more gas components. The apparatus of the invention comprises the following components:

(a) an ejector including a motive gas inlet, a suction gas inlet, and a mixed gas outlet;

(b) a first separation unit in gas communication with the mixed gas outlet, wherein the first separation unit has a first product outlet and a first non-product outlet; and (c) a second separation unit in gas communication with the first non-product outlet, wherein the second separation unit has a second product outlet and a second non-product outlet, and wherein the second non-product outlet is in gas communication with the suction gas inlet.

When the first separation unit is a membrane separation unit, the second separation unit is typically selected from the group consisting of: a partial condenser, an absorption unit, a pressure swing adsorption unit, and a second membrane separation unit.

When the first separation unit is a partial condenser, an absorption unit, or a pressure swing adsorption unit, the second separation unit is a membrane separation unit.

The apparatus of the invention is designed to perform the processes of the invention. Because of the advantages discussed above with respect to the processes of the invention, the apparatus of the invention is particularly useful in the retrofit of existing plants, because no additional, high-cost compression equipment need be purchased.

DETAILED DESCRIPTION OF THE INVENTION

Figure 1:
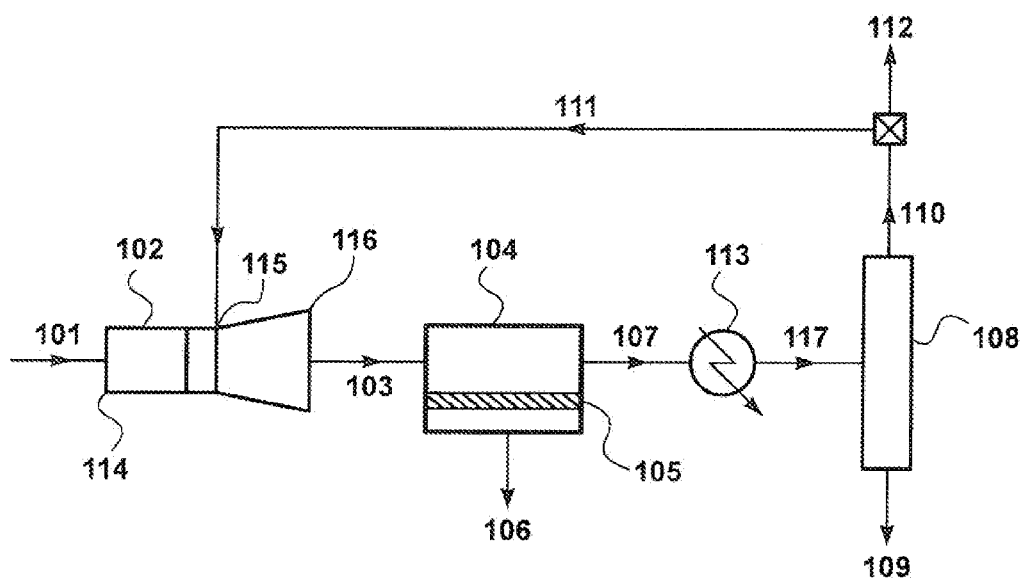
FIG. 1 is a schematic drawing of an embodiment of the gas separation process of the present invention that utilizes a membrane separation step followed by a partial condensation step.

A basic embodiment of the invention that utilizes a membrane separation step followed by a partial condensation step is illustrated in FIG. 1. A motive gas, 101, comprising a gas mixture that includes at least two gas components (referred to herein as "Gas Component A" and "Gas Component B" for simplicity purposes) is introduced into the motive gas inlet, 114, of an ejector, 102. A suction gas, 111, is introduced into the suction gas inlet, 115, of the ejector.

A mixed gas, 103, comprising the motive gas and the suction gas is withdrawn from the mixed gas outlet, 116, of ejector 102. Mixed gas 103 is sent for treatment in a membrane separation unit, 104, that contains membranes, 105, that are selectively permeable to Gas Component A over Gas Component B. To prevent condensation on the surface of the membranes 105, mixed gas 103 is preferably heated (heater not shown) prior to being sent to membrane separation unit 104.

Any membrane material appropriate for the particular gas separation to be performed may be used. However, preferred membrane materials are glassy polymers, which preferentially permeate light hydrocarbons over heavier ($C_3$+) hydrocarbons. Examples of such polymers include, without limitation, polyamides, polyimides, polysulfones, polyvinyl alcohol, polypropylene oxide, cellulose derivatives, polyvinylidene fluoride, and polymers having repeating units of fluorinated dioxoles, fluorinated dioxolanes, and fluorinated cyclically polymerizable alkyl ethers.

Particularly preferred membranes for use in the process of the invention have selective layers made from a hydrophobic fluorinated glassy polymer or copolymer. This polymer determines the membrane selectivity.

The preferred form is a composite membrane. Modern composite membranes typically comprise a highly permeable, but relatively non-selective, support membrane that provides mechanical strength, coated with a thin selective layer of another material that is primarily responsible for the separation properties. Typically, but not necessarily, such a composite membrane is made by solution-casting the support membrane, then solution-coating the selective layer. Preparation techniques for making composite membranes of this type are well-known.

The membranes may be manufactured as flat sheets or as fibers and housed in any convenient module form, including spiral-wound modules, plate-and-frame modules, and potted hollow fiber modules. The making of all these types of membranes and modules is well-known in the art. Flat-sheet membranes in spiral-wound modules is the most preferred choice.

Membrane unit 104 may contain a single membrane module or bank of membrane modules or an array of modules. A single-stage membrane separation operation is adequate for many applications. If the permeate stream requires further purification, it may be passed to a second bank of membrane modules for a second processing step. If the residue stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multi-stage, multi-step, or more complicated arrays of two or more units in serial or cascade arrangements.

Mixed gas stream 103, which is at high pressure, flows across the feed surface of the membrane 105. The permeate side of the membrane is maintained at lower pressure to provide a driving force for transmembrane permeation. Gas Component A permeates the membrane preferentially, resulting in a permeate stream, 106, that is enriched in Gas Component A as compared with mixed gas 103, and a residue stream, 107, that is depleted in Gas Component A as compared with mixed gas 103. Typically, the feed side is maintained at a pressure within the range of about 30 psia to about 5,000 psia; preferably, within the range of about 50 psia to about 1,500 psia. The permeate side is typically maintained at a pressure within the range of about 1 psia to about 1,000 psia; preferably, within the range of about 3 psia to about 300 psia.

As discussed above, glassy polymer membranes are particularly preferred for use in hydrocarbon separations. When glassy polymer membranes are used to separate light hydrocarbons from heavier hydrocarbons, no additional compression power is required, because the heavy hydrocarbon-enriched membrane residue stream 107 that is recycled back to the process remains at pressure, subject only to slight losses along the membrane modules or pipework, and may be passed to the condensation step without further compression.

As is familiar to those of skill in the art, the separation performance achieved by the membrane depends on such factors as the membrane selectivity, the pressure ratio between feed and permeate sides, and the membrane area. The transmembrane flux depends on the permeability of the membrane material, the pressure difference across the membrane, and the membrane thickness.

Membrane residue stream 107 is withdrawn from the feed side of the membrane unit 104. Membrane residue stream 107 is then routed through a chiller, 113. Cooled residue stream, 117, is passed to a partial condenser, 108. A liquid product stream, 109, is withdrawn from partial condenser 108. An overhead gas stream, 110, that is depleted in Gas Component B relative to residue stream 107, is withdrawn from the top of the partial condenser.

A major portion of overhead gas stream 110 is routed back to ejector 102 as suction gas 111.

Commonly, additional components will be present as contaminants in the gas stream to be treated. Depending on the source of the raw gas, representative components may include nitrogen, argon, carbon monoxide, and the like. These may not be well-separated into either product stream and will tend to build up in the treatment loop. In the event that such contaminants are present, they may be removed by drawing a small purge stream from the gas loop at any convenient point.

As shown in FIG. 1, portion, 112, of overhead gas stream 110 is purged/bled from the process loop. Portion 112 is small in comparison to stream 111 and is usually just a minor portion of stream 110; typically, portion 112 is less than about 10% and, more typically, less than about 5%, of stream 110.

As discussed in the "Summary of the Invention", the processes disclosed herein are particularly effective when the total stage cut through the two (or more) separation steps is at least 40%, and is preferably at least 50-60%. With respect to the basic process embodiment shown in FIG. 1, this means that at least 40 wt % of gas stream 103 is recovered as products (permeate stream 106+liquid product stream 109), and 60 vol % or less is recycled back to the ejector as part of suction gas 113.

Figure 8:
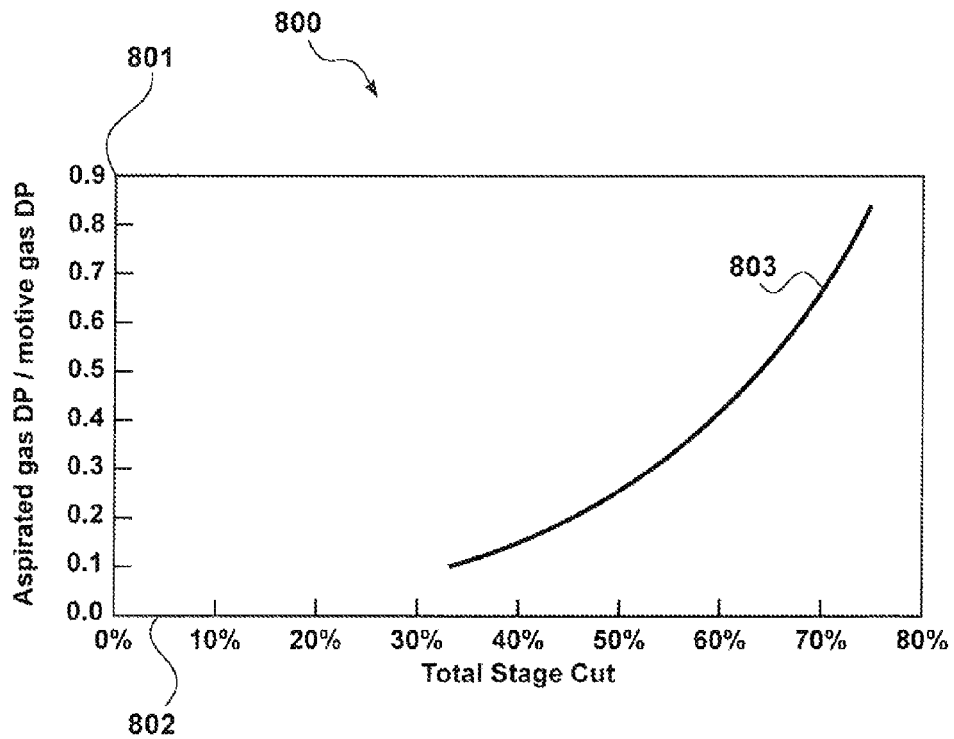
FIG. 8 is a plot of aspirated (suction) gas differential pressure (DP)/motive gas differential pressure (DP) as a function of total stage cut.

FIG. 8 is a plot, 800, showing aspirated (suction) gas differential pressure (DP)/motive gas differential pressure (DP), 801, as a function of total stage cut, 802. Referring back to FIG. 1, if motive gas 101 entering ejector 102 is, for example, at a pressure of 20 bar, and mixed gas 103 exiting the ejector is at a pressure of 18 bar, then the motive gas DP would equal 2 (20−18). If mixed gas 103 exiting the ejector is at a pressure of 18 bar, and the suction gas 111 being recycled back to the ejector is at a pressure of 17.5 bar, then the aspirated gas DP would equal 0.5 (18−17.5), and the aspirated gas DP/motive gas DP would equal 0.25, as follows:

$$\frac{\text{Aspirated Gas } DP}{\text{Motive Gas } DP} = \frac{18 - 17.5}{20 - 18} = \frac{0.5}{2} = 0.25$$

Referring back to FIG. 8, an aspirated gas DP/motive gas DP ratio of 0.25 would correspond to a total stage cut of 50% on curve 803.

Figure 2:
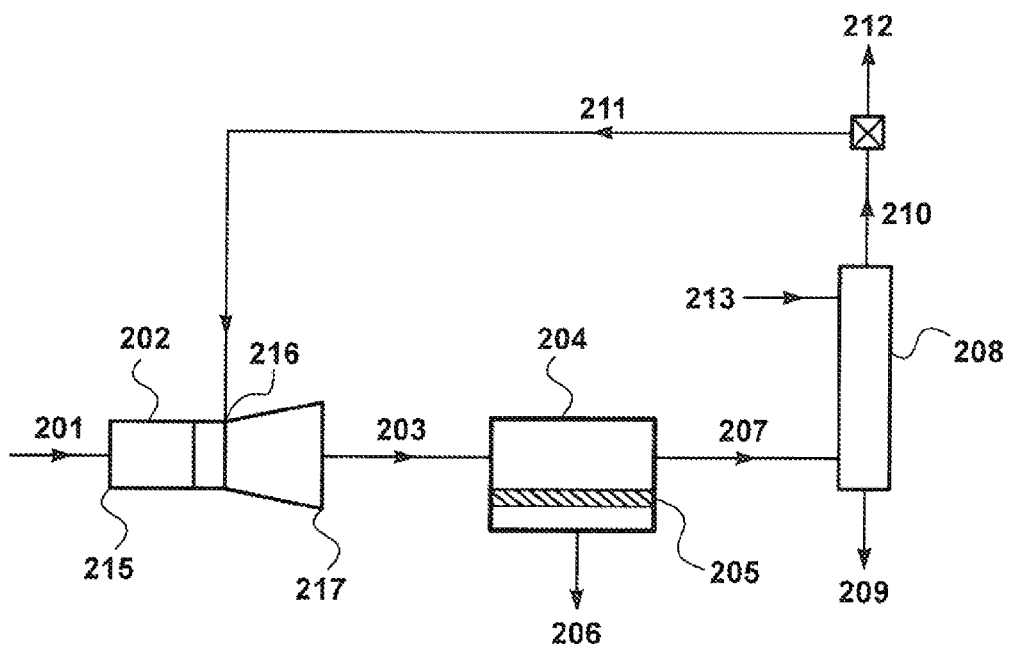
FIG. 2 is a schematic drawing of an embodiment of the gas separation process of the present invention that utilizes a membrane separation step followed by an absorption step.

A basic embodiment of the invention that utilizes a membrane separation step followed by an absorption step is illustrated in FIG. 2. A motive gas, 201, comprising a gas mixture that includes at least two gases, Gas Component A and Gas Component B, is introduced into the motive gas inlet, 215, of an ejector, 202. A suction gas, 211, is introduced into the suction gas inlet, 216, of the ejector.

A mixed gas, 203, comprising the motive gas and the suction gas is withdrawn from the mixed gas outlet, 217, of ejector 202. Mixed gas 203 is sent for treatment in a membrane separation unit, 204, that contains membranes, 205, that are selectively permeable to Gas Component A over Gas Component B. Membrane materials and modules are as described above with respect to the invention embodiment illustrated in FIG. 1.

Mixed gas stream 203, which is at high pressure, flows across the feed surface of the membrane 205. The permeate side of the membrane is maintained at lower pressure to provide a driving force for transmembrane permeation. Gas Component A permeates the membrane preferentially, resulting in a permeate stream, 206, that is enriched in Gas Component A as compared with mixed gas 203, and a residue stream, 207, that is depleted in Gas Component A as compared with mixed gas 203.

Membrane residue stream 207 is withdrawn from the feed side of membrane unit 204. Membrane residue stream 207 is then routed to an absorption unit, 208. The absorption step 208 can be performed using any suitable absorbent that has an affinity for Gas Component B.

For example, if the process is designed to take out heavy hydrocarbons, the absorption step 208 can be performed using lean oil absorption. In lean oil absorption, a gas with hydrocarbon vapors enters the bottom of an absorber column and flows upward, contacting the counter-flowing lean oil. The lean oil preferentially absorbs the vapors from the gas, becoming enriched oil. This rich oil is sent to a stripper, where the absorbed vapors are removed by heating the rich oil, thereby vaporizing the absorbed vapors. The rich oil is thus regenerated as lean oil and recycled to the absorber to complete the process loop. The vaporized vapors are liquefied and transferred to storage.

Returning to FIG. 2, liquid product stream, 209, is withdrawn from absorption unit 208. An overhead gas stream, 210, that is depleted in Gas Component B relative to residue stream 207, is withdrawn from the top of the absorption unit. A major portion of overhead gas stream 210 is routed back to ejector 202 as suction gas 211.

The remaining portion, 212, of overhead gas stream 210 is purged/bled from the process loop. Portion 212 is small in comparison to stream 211 and is usually just a minor portion of stream 210; typically, portion 212 is less than about 10% and, more typically, less than about 5%, of stream 210.

Figure 3:
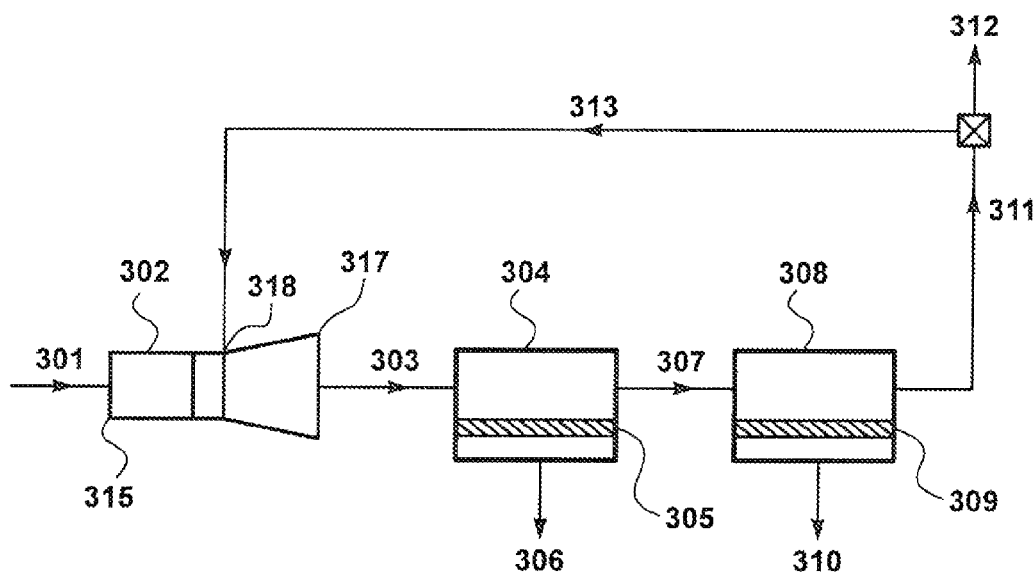
FIG. 3 is a schematic drawing of an embodiment of the gas separation process of the present invention that utilizes two sequential membrane separation steps.

A basic embodiment of the invention that utilizes two sequential membrane separation steps is illustrated in FIG. 3. A motive gas, 301, comprising a gas mixture that includes at least two gases, Gas Component A and Gas Component B, is introduced into the motive gas inlet, 315, of an ejector, 302. A suction gas, 313, is introduced into the suction gas inlet, 318, of the ejector.

A mixed gas, 303, comprising the motive gas and the suction gas is withdrawn from the mixed gas outlet, 317, of ejector 302. Mixed gas 303 is sent for treatment in a first membrane separation unit, 304, that contains membranes, 305, that are selectively permeable to Gas Component A over Gas Component B. Membrane materials and modules are as described above with respect to the invention embodiment illustrated in FIG. 1.

Mixed gas stream 303, which is at high pressure, flows across the feed surface of the first membrane 305. The permeate side of the first membrane is maintained at lower pressure to provide a driving force for transmembrane permeation. Gas Component A permeates the first membrane preferentially, resulting in a first permeate stream, 306, that is enriched in Gas Component A as compared with mixed gas 303, and a first residue stream, 307, that is depleted in Gas Component A as compared with mixed gas 303.

First membrane residue stream 307 is withdrawn from the feed side of first membrane unit 304. First membrane residue stream 307 is then routed to a second membrane separation unit, 308.

Any membrane material appropriate for the particular gas separation to be performed may be used in the second membrane separation unit. However, the membrane used for the second membrane separation step will typically have an opposite selectivity to the membrane used for the first membrane separation step. As such, the second membrane is typically made from an elastomeric or rubbery polymer.

Examples of polymers that can be used to make elastomeric membranes include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly (butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters.

Alternatively, the first membrane may comprise a rubbery polymer, and the second membrane may comprise a glassy polymer.

First membrane residue stream 307, which is still at pressure, flows across the feed surface of the second membrane 308. The permeate side of the second membrane is maintained at lower pressure to provide a driving force for transmembrane permeation. Gas Component B permeates the second membrane preferentially, resulting in a second permeate stream, 310, that is enriched in Gas Component B as compared with first membrane residue stream 307, and a second residue stream, 311, that is depleted in Gas Component B as compared with first membrane residue stream 307.

A major portion of second residue stream 311 is routed back to ejector 302 as suction gas 313. The remaining portion, 312, of overhead gas stream 311 is purged/bled from the process loop. Portion 312 is small in comparison to stream 313 and is usually just a minor portion of stream 311; typically, portion 312 is less than about 10% and, more typically, less than about 5%, of stream 311.

Figure 4:
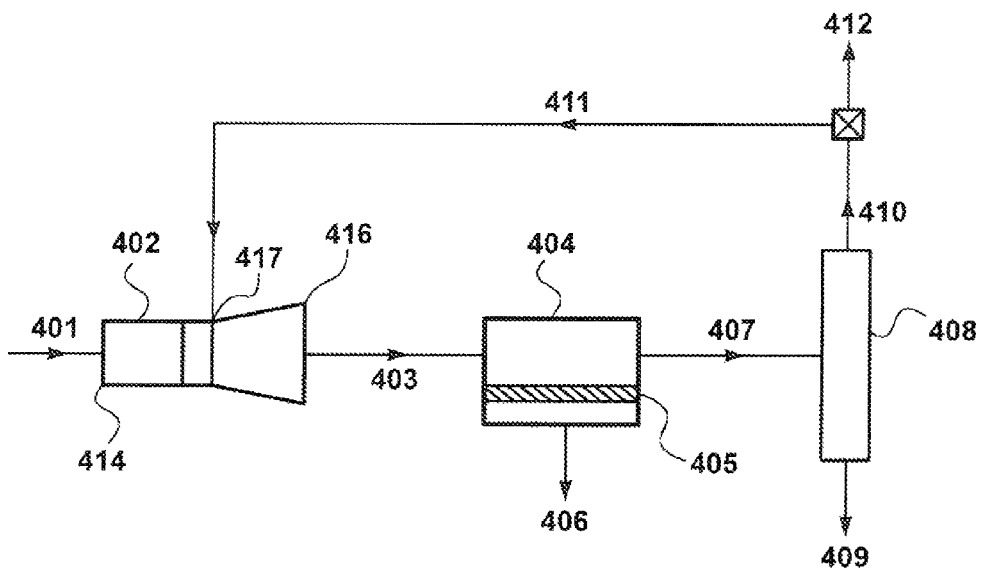
FIG. 4 is a schematic drawing of an embodiment of the gas separation process of the present invention that utilizes a membrane separation step followed by a pressure swing adsorption (PSA) step.
Figure 5:
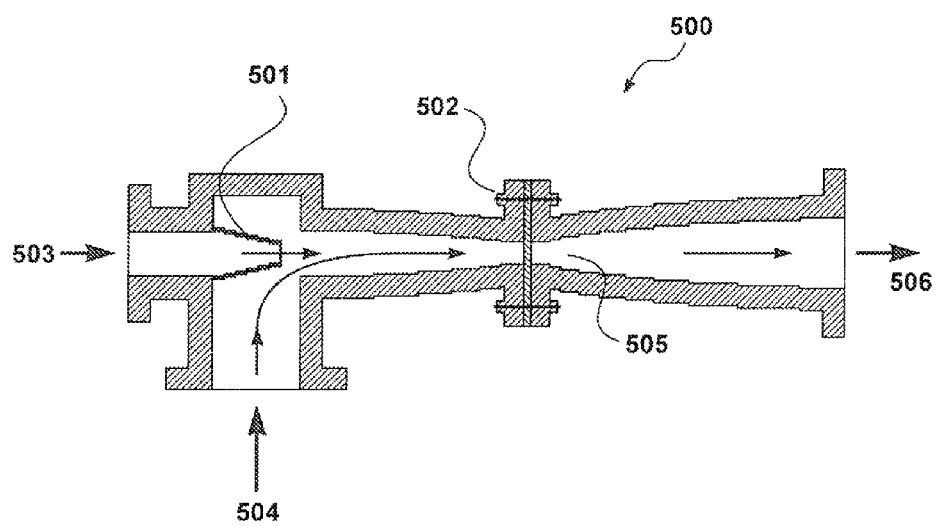
FIG. 5 is a diagram of a typical ejector.

A basic embodiment of the invention that utilizes a membrane separation step followed by a pressure swing adsorption (PSA) step is illustrated in FIG. 4. A motive gas, 401, comprising a gas mixture that includes at least two gases, Gas Component A and Gas Component B, is introduced into the motive gas inlet, 414, of an ejector, 402. A suction gas, 411, is introduced into the suction gas inlet, 417, of the ejector.

A mixed gas, 403, comprising the motive gas and the suction gas is withdrawn from the mixed gas outlet, 416, of ejector 402. Mixed gas 403 is sent for treatment in a membrane separation unit, 404, that contains membranes, 405, that are selectively permeable to Gas Component A over Gas Component B. Membrane materials and modules are as described above with respect to the invention embodiment illustrated in FIG. 1.

Mixed gas stream 403, which is at high pressure, flows across the feed surface of the membrane 405. The permeate side of the membrane is maintained at lower pressure to provide a driving force for transmembrane permeation. Gas Component A permeates the membrane preferentially, resulting in a residue stream, 407, that is depleted in Gas Component A as compared with mixed gas 403, and a permeate stream, 406, that is enriched in Gas Component A as compared with mixed gas 403.

Membrane residue stream 407 is withdrawn from the feed side of membrane unit 404. Membrane residue stream 407 is then routed to a PSA unit, 408. Pressure swing adsorption is a process used to separate certain gas species from a pressurized gas mixture according to the species' molecular characteristics and affinity for an adsorbent material. Specialized adsorptive materials (e.g., zeolites) are used as a molecular sieve, preferentially adsorbing the target gas species at high pressure. In this Example, the adsorbent is selected to adsorb Gas Component B, and not adsorb Gas Component A.

After the adsorption step, the process then swings to low pressure to desorb the adsorbent materials. Although a typical PSA unit actually consists of two discrete beds, for simplicity, PSA unit 408 is represented in FIG. 4 as a single box.

A low-pressure gas stream, 409—enriched in Gas Component B relative to residue stream 407—is withdrawn from PSA unit 408. A residue gas stream, 410—depleted in Gas Component B relative to residue stream 407—leaves the PSA unit at pressure. A major portion, 411, of residue gas stream 410 is routed back to ejector 402 as suction gas 411.

The remaining portion, 412, of residue gas stream 410 is purged/bled from the process loop. Portion 412 is small in comparison to stream 411 and is usually just a minor portion of stream 410; typically, portion 412 is less than about 10% and, more typically, less than about 5%, of stream 410.

Figure 6:
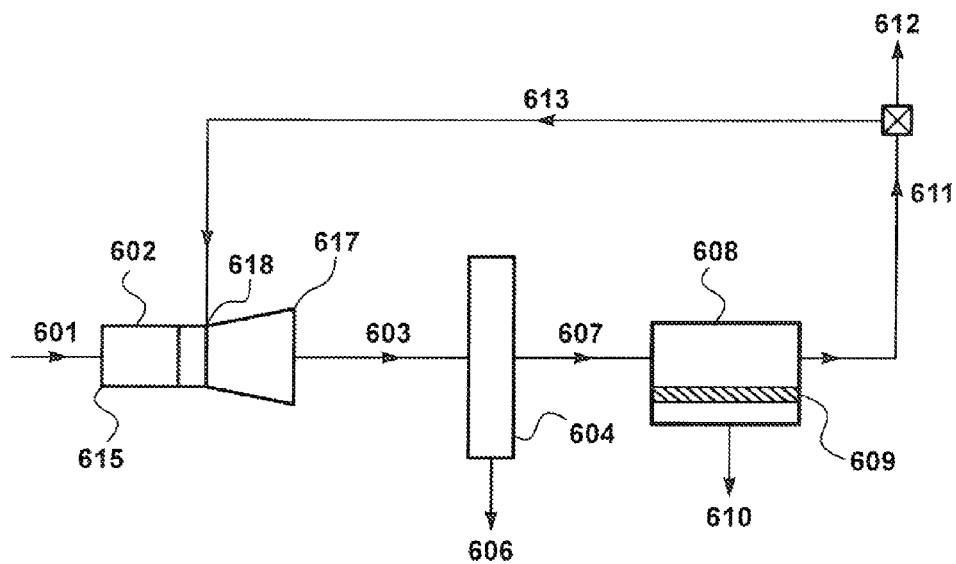
FIG. 6 is a schematic drawing of an alternate embodiment of the invention in which a first, non-membrane separation step is performed prior to the performance of a membrane separation step.

In an alternative embodiment of the invention, a non-membrane separation step is performed first, followed by a membrane separation step. This embodiment is depicted in FIG. 6.

Referring to the figure, a motive gas, 601, comprising a gas mixture that includes at least two gases, Gas Component A and Gas Component B, is introduced into the motive gas inlet, 615, of an ejector, 602. A suction gas, 613, is introduced into the suction gas inlet, 618, of the ejector.

A mixed gas, 603, comprising the motive gas and the suction gas is withdrawn from the mixed gas outlet, 617, of ejector 602. Mixed gas 603 is sent for treatment in a first, non-membrane separation unit, 604, which preferentially removes Gas Component A, and which may be (by way of example and not by way of limitation) a partial condenser, an absorption unit, or a PSA unit.

A product stream, 606, enriched in Gas Component A, is withdrawn from first separation unit 604. A non-product stream, 607, is sent for treatment in a membrane unit, 608, that contains membranes, 609, that are selectively permeable to Gas Component B over Gas Component A. Membrane materials and modules are as described above with respect to the invention embodiment illustrated in FIG. 1. To prevent condensation on the surface of the membranes 609, non-product stream 607 is preferably heated (heater not shown) prior to being sent to membrane separation unit 608.

Non-product stream 607 flows across the feed surface of the membrane 609. The permeate side of the first membrane is maintained at lower pressure than the feed side to provide a driving force for transmembrane permeation. Gas Component B permeates the membrane preferentially, resulting in a first permeate stream, 610, that is enriched in Gas Component B as compared with non-product stream 607, and a residue stream, 611, that is depleted in Gas Component B as compared with non-product stream 607.

A major portion, 613, of residue stream 611 is routed back to ejector 602 as suction gas 613. The remaining portion, 612, of overhead gas stream 611 is purged/bled from the process loop. Portion 612 is small in comparison to stream 613 and is usually just a minor portion of stream 611; typically, portion 612 is less than about 10% and, more typically, less than about 5%, of stream 611.

Figure 7:
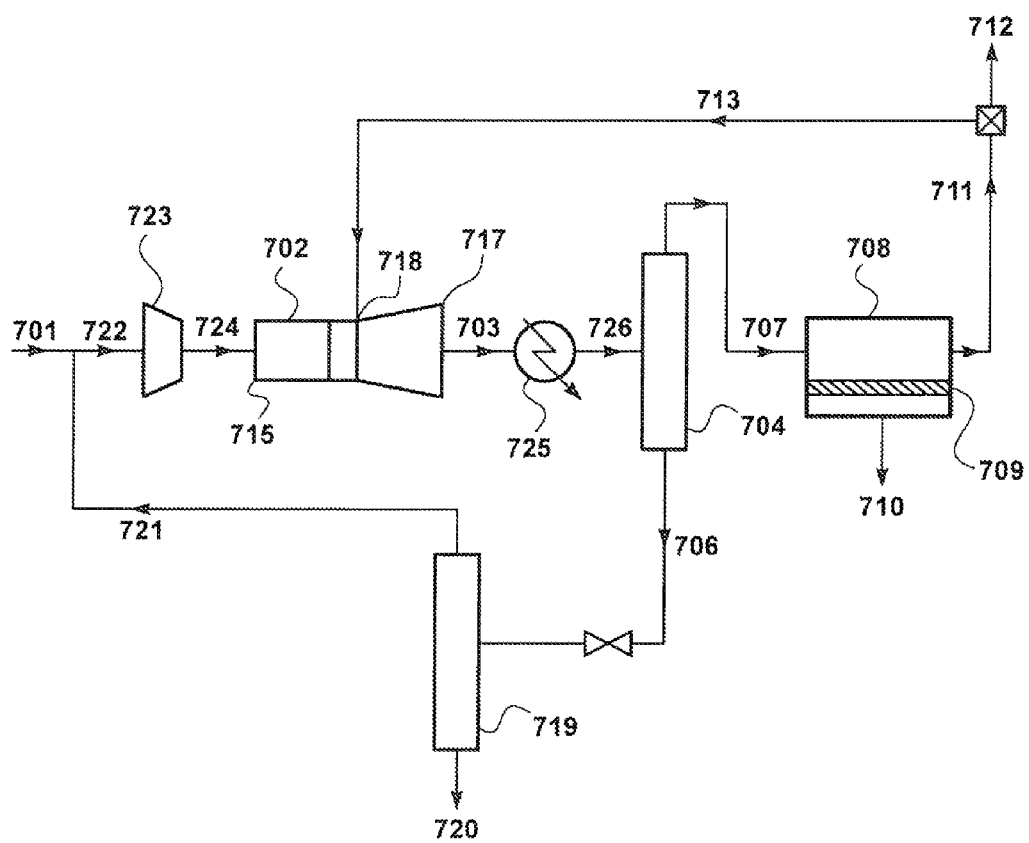
FIG. 7 is a schematic drawing of a variant of the invention embodiment shown in FIG. 6, where the non-membrane separation step is a partial condensation step.

FIG. 7 is a schematic drawing of a variant of the invention embodiment shown in FIG. 6, where the non-membrane separation step is a partial condensation step, and where the low-pressure gas is first compressed before partial condensation. The liquid product stream from the partial condensation step is flashed to a low-pressure flash vessel, and low-pressure flash gas is returned to the inlet of the compressor. This variant makes the partial condensation step more efficient, because condensed light material is flashed out of the liquid and returned to the vapor loop.

Referring to the figure, a motive gas, 722, comprising a gas mixture that includes at least two gases, Gas Component A and Gas Component B, is compressed in compressor, 723. Compressed gas stream, 724, is introduced into the motive gas inlet, 715, of an ejector, 702. A suction gas, 713, is introduced into the suction gas inlet, 718, of the ejector.

A mixed gas, 703, comprising the motive gas and the suction gas, is withdrawn from the mixed gas outlet, 717, of ejector 702. Mixed gas 703 is then partially condensed in chiller, 725, and sent as two-phase stream, 726, for treatment in a separator, 704.

A first liquid product stream, 706, is withdrawn from separator 704, then flashed to a low-pressure flash vessel, 719. Low-pressure flash gas, 721, is routed back to the beginning of the process, where it joins feed gas, 701, as part of the motive gas 722 entering the compressor 723.

A second liquid product stream, 720, is withdrawn from flash vessel 719.

An overhead gas stream, 707, from separator 704 is sent for treatment in a membrane unit, 708, that contains membranes, 709, that are selectively permeable to Gas Component B over Gas Component A. Membrane materials and modules are as described above with respect to the invention embodiment illustrated in FIG. 3. To prevent condensation on the surface of the membranes 709, overhead gas stream 707 is preferably heated (heater not shown) prior to being sent to membrane separation unit 708.

Overhead gas stream 707 flows across the feed surface of the membrane 709. The permeate side of the first membrane is maintained at lower pressure than the feed side to provide a driving force for transmembrane permeation. Gas Component B permeates the membrane preferentially, resulting in a first permeate stream, 710, that is enriched in Gas Component B as compared with overhead gas stream 707, and a residue stream, 711, that is depleted in Gas Component B as compared with overhead gas stream 707.

A major portion, 713, of residue stream 711 is routed back to ejector 702 as suction gas 713. The remaining portion, 712, of overhead gas stream 611 is purged/bled from the process loop. Portion 712 is small in comparison to stream 713 and is usually just a minor portion of stream 711; typically, portion 712 is less than about 10% and, more typically, less than about 5%, of stream 711.

The process of the invention can be used to separate a wide variety of gas mixtures including, without limitation:

Condensable gases such as $C_{2+}$ hydrocarbons from non-condensable gases such as methane, nitrogen, and hydrogen;

Gases that rapidly permeate glassy membranes (e.g., hydrogen, carbon dioxide, nitrogen) from gases that quickly permeate rubbery membranes (e.g., hydrocarbons);

Gases that rapidly permeate glassy membranes (e.g., hydrogen) from gases that quickly permeate polyamide/polyether-based membranes (e.g., acid gases);

Gases that rapidly permeate glassy membranes (e.g., hydrogen, carbon dioxide, nitrogen) from gases that are readily absorbed in common absorbents, such as hydrocarbons in lean oil.

As discussed in the "Summary of the Invention", the processes of the invention are useful in a wide number of gas separation applications including, but not limited to, treatment of natural gas streams, such as to remove excess hydrocarbons, nitrogen or carbon dioxide; treatment of refinery off-gases to recover hydrogen or light hydrocarbons; and treatment of process and off-gas streams related to diverse petrochemical processes, such as to recover feedstocks or remove contaminants.

Specific gas treatment applications in which the processes of the invention may prove beneficial include dewpointing; natural gas liquid (NGL) recovery; liquefied petroleum gas (LPG) recovery from flare gas; and nitrogen removal from natural gas.

Dewpointing is a process whereby raw gas is treated to a lower gas dewpoint so that it can be sent for further processing. LPG recovery from flare gas is an end-of-pipe treatment to recover at least some transportable liquid product from gas to be flared (the remaining, untreated gas goes on to be flared). Prior to the present invention, dewpointing and LPG recovery from flare gas were conventionally done by refrigeration (i.e., cooling and condensing).

The invention is now further described by the following examples, which are intended to be illustrative of the invention, but are not intended to limit the scope or underlying principles in any way.

EXAMPLES

Example 1

Process of the Invention for Nitrogen Removal with Membranes of Unlike Selectivities Two types of membranes, the properties of which are shown in Table 1, are used in the following Examples. The first type is polar rubbery membranes that selectively permeate hydrocarbons over nitrogen. The hydrocarbon/nitrogen selectivity of these membranes is about 3.3 at room temperature. The second type of membrane uses a rigid glassy polymer that selectively permeates nitrogen over hydrocarbons. The nitrogen/hydrocarbon selectivity of this membrane is about 2.5 at room temperature.

TABLE 1

Permeances of Membranes Used in Examples

| | Mixed Gas Permeance (gpu) | |
|---|---|---|
| Gas Component | Rubbery Membrane | Glassy Membrane |
| Hydrogen | 220 | 800 |
| Methane | 330 | 300 |
| Nitrogen | 110 | 600 |
| Ethylene | 500 | 150 |
| Ethane | 500 | 150 |
| 1-Butene | 1,660 | 30 |
| n-Butane | 1,660 | 30 |
| i-Pentane | 1,660 | 30 |
| 1-Hexene | 1,660 | 30 |
| n-Hexane | 1,660 | 30 |
| Water | 2,460 | 1,000 |

The calculations that follow were performed using a computer process simulation program (ChemCad 6.32, ChemStations, Houston, Tex.) which was modified with differential element subroutines for the membrane separation steps.

The following calculation was performed according to the process schematic illustrated in FIG. 3, to remove nitrogen from a nitrogen/hydrocarbon mixture. The feed nitrogen/hydrocarbon mixture is the vent gas from the purge bin in a polyethylene plant. These mixtures are conventionally processed by compression and condensation to recover condensable hydrocarbons, which are then reused in the polyethylene process. Removing nitrogen from the gas stream prior to the compression/condensation process provides a more concentrated hydrocarbon stream for processing, enabling more hydrocarbons to be recovered at a particular condensation temperature. In the present example, the compression/condensation step is being debottlenecked by two membrane separation steps, as shown in FIG. 3, and an additional compressor (not shown in the figure) feeding the ejector. This system generates two low-pressure gas streams: a concentrated hydrocarbon stream which may be fed to a compression/condensation process (not shown), and a nitrogen stream that can be used to degas raw polymer in the purge bin.

Membrane areas were assumed to be 330 m$^2$ and 63 m$^2$ for membranes 305 and 309, respectively. Results of the calculation are presented in Table 2.

TABLE 2

Nitrogen Removal With Two Types of Membranes

| Stream Composition (mol %) | Motive Gas (301) | Mixed Gas Stream (303) | First Membrane Residue (307) | First Membrane Permeate (306) | Suction (Recycle) Gas (313) | Second Membrane Permeate (310) |
|---|---|---|---|---|---|---|
| Methane | 0.44 | 0.42 | 0.29 | 0.54 | 0.38 | 0.20 |
| Nitrogen | 61.5 | 68.2 | 93.9 | 45.4 | 89.7 | 98.1 |
| Ethylene | 7.9 | 7.2 | 3.2 | 10.8 | 5.2 | 1.3 |
| Ethane | 1.8 | 1.6 | 0.7 | 2.4 | 1.2 | 0.29 |
| 1-Butene | 9.9 | 7.9 | 0.7 | 14.3 | 1.2 | 0.06 |
| n-Butane | 3.5 | 2.8 | 0.2 | 5.1 | 0.44 | 0.02 |
| i-Pentane | 14.9 | 11.9 | 1.0 | 21.5 | 1.9 | 0.09 |
| Molar Flow (kmol/h) | 163 | 213 | 100 | 113 | 50.1 | 50.1 |
| Temp. (° C.) | 30 | 59 | 50 | 30 | 48 | 49 |
| Pressure (bar) | 1.3 | 15 | 15 | 1.8 | 15 | 3.0 |

After passing through first membrane unit 304 that contains rubbery polymer membranes 305, the resulting first membrane residue stream 307 is depleted in hydrocarbons and enriched in nitrogen compared with mixed gas stream 302; first membrane permeate stream 306 is enriched in hydrocarbons and depleted in nitrogen compared with mixed gas stream 302.

After passing through second membrane unit 308 that contains glassy polymer membranes 309, the resulting second membrane residue stream 313 is enriched in hydrocarbons and depleted in nitrogen compared with first membrane residue stream 307; second membrane permeate stream 310 is enriched in nitrogen and depleted in hydrocarbons compared with first membrane residue stream 307. Second membrane residue stream 313 is recycled back as suction gas into the suction gas inlet 318 of ejector 302. Second membrane permeate stream 310 can be used as purge bin nitrogen.

Example 2

Comparative Example-Conventional Process to Recover Liquids from a Gas being Flared (not in Accordance with the Invention)

Figure 9:
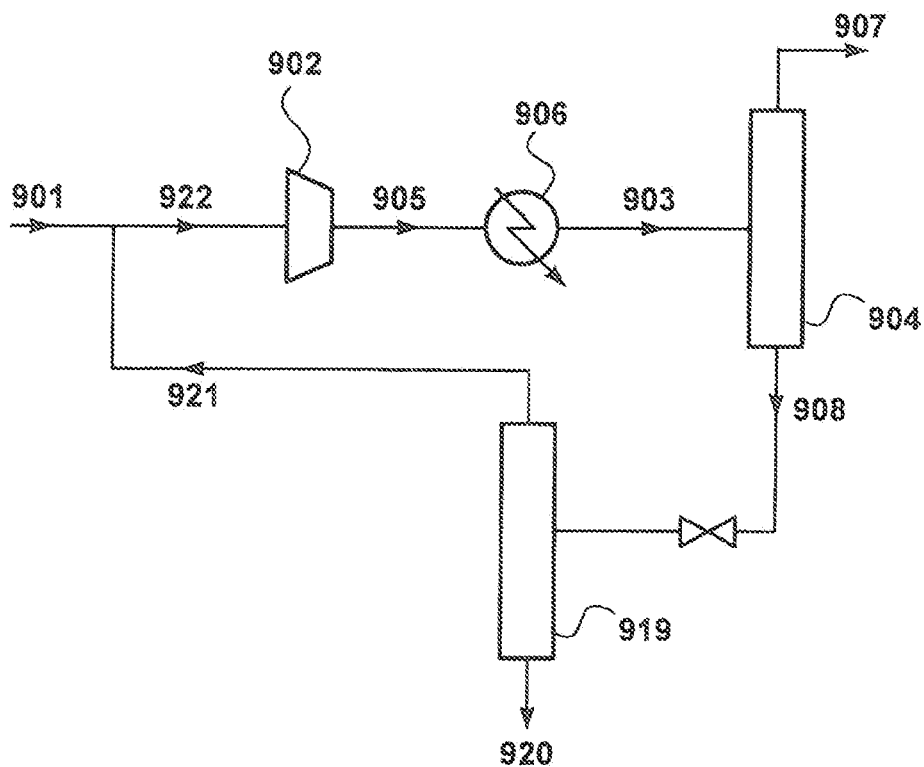
FIG. 9 is a schematic drawing of a conventional process to recover liquids from a gas being flared (not in accordance with the invention).

The following calculation was performed according to the process schematic illustrated in FIG. 9, which shows a conventional process to recover liquids from a gas being flared. The feed gas is available at 500 psia (34.5 bar). This gas is compressed up to 600 psia (41.4 bar), air-cooled to 40° C., then refrigerated to −20° C. to condense out natural gas liquids (NGL). The condensate is flashed to the pressure of the compressor inlet and the recovered liquids are then sent for further processing. The gas exiting the chiller is sent to flare.

Referring to the figure, a gas mixture, 901, that includes at least two gases, Gas Component A and Gas Component B, is compressed in compressor, 902, producing compressed gas mixture, 905. Compressed gas mixture 905 is then condensed in chiller, 906, and sent as chilled stream, 903, for treatment in a partial condensation unit, 904.

An overhead gas stream, 907, is withdrawn and flared. A first liquid product stream, 908, is withdrawn from first partial condensation unit 904 and then routed to a low-pressure flash vessel, 919. A second liquid product stream, 920, is withdrawn from flash vessel 919. An overhead gas stream, 921, is withdrawn from the top of flash vessel 919. This stream is then routed back to the compressor suction, where it joins feed gas, 901, as part of the gas mixture 922 entering the compressor 902.

Results of the calculation are presented in Table 3.

TABLE 3

Conventional Process for Liquids Recovery

| Stream Composition (mol %) | Feed Gas (901) | Mixed Gas (922) | Compressed Gas (905) | Condenser Feed (903) | Vent Gas (907) | Condensate (906) | Recycle Gas (921) | Liquid Stream (920) |
|---|---|---|---|---|---|---|---|---|
| Carbon Dioxide | 0.10 | 0.10 | 0.10 | 0.10 | 0.10 | 0.07 | 0.17 | 0.04 |
| Nitrogen | 1.0 | 1.0 | 1.0 | 1.0 | 1.0 | 0.08 | 0.27 | 0 |
| Methane | 88.7 | 88.6 | 88.6 | 88.6 | 89.7 | 24.8 | 79.6 | 4.6 |
| Ethane | 5.6 | 5.6 | 5.6 | 5.6 | 5.6 | 10.7 | 13.0 | 9.9 |
| Propane | 3.1 | 3.1 | 3.1 | 3.1 | 2.8 | 20.9 | 5.8 | 26.4 |
| i-Butane | 0.31 | 0.31 | 0.31 | 0.31 | 0.24 | 4.6 | 0.38 | 6.1 |
| n-Butane | 0.72 | 0.72 | 0.72 | 0.72 | 0.49 | 14.1 | 0.71 | 19.0 |
| Cyclopentane | 0.02 | 0.02 | 0.02 | 0.02 | 0.01 | 1.0 | 0.01 | 1.4 |
| i-Pentane | 0.11 | 0.11 | 0.11 | 0.11 | 0.05 | 3.7 | 0.05 | 5.1 |
| n-Pentane | 0.06 | 0.06 | 0.06 | 0.06 | 0.02 | 2.4 | 0.02 | 3.3 |
| Cyclohexane | 0.02 | 0.02 | 0.02 | 0.02 | 0 | 0.87 | 0 | 1.2 |
| n-Hexane | 0.08 | 0.08 | 0.08 | 0.08 | 0.01 | 4.1 | 0.01 | 5.6 |
| Benzene | 0.05 | 0.05 | 0.05 | 0.05 | 0.01 | 2.5 | 0 | 3.4 |
| n-Heptane | 0.09 | 0.09 | 0.09 | 0.09 | 0 | 5.1 | 0 | 6.8 |
| n-Octane | 0.09 | 0.09 | 0.09 | 0.09 | 0 | 5.2 | 0 | 7.1 |
| Molar Flow (kmol/h) | 1,160 | 1,166 | 1,166 | 1,166 | 1,147 | 19.1 | 5.1 | 13.9 |
| Temp. (° C.) | 40 | 26 | 191 | −20 | −20 | −20 | −36 | −36 |
| Pressure (bar) | 34.5 | 6.9 | 40.7 | 40.7 | 40.7 | 40.7 | 6.9 | 6.9 |

Example 3

Process of the Invention with Partial Condensation Followed by Membrane Separation The following calculation was performed according to the process schematic illustrated in FIG. 7, which is basically a conventional system to recover liquids from a gas being flared that has been retrofitted with the system of the invention. Again, the gas is available at 500 psia (34.5 bar), compressed up to 600 psia (41.4 bar), and air-cooled to 40° C. The gas is then passed through an ejector prior to being refrigerated to −20° C. to condense out NGL.

The gas exiting the partial condenser is not passed directly to flare: It is first heated (heater not shown) to a temperature above its dew point, then passed over a "glassy" membrane. The resulting permeate is passed to flare. Retentate from the high-pressure side of the membrane is passed to the suction port of the ejector, recycling concentrated uncondensed material back to the condenser.

Results of this calculation are presented in Table 4. Membrane area was assumed to be 490 m².

TABLE 4

Retrofitted Process for Liquids Recovery

| Stream Composition (mol %) | Feed Gas (701) | Compressed Gas (722) | Condenser Feed (703) | Membrane Feed (707) | Membrane Residue (Recycle to Ejector) (711) | Membrane Permeate (710) | Condensate (706) | Recycle Gas (721) | Liquid Stream (720) |
|---|---|---|---|---|---|---|---|---|---|
| Carbon Dioxide | 0.10 | 0.10 | 0.08 | 0.08 | 0.03 | 0.10 | 0.06 | 0.13 | 0.03 |
| Nitrogen | 1.0 | 1.0 | 0.89 | 0.91 | 0.58 | 1.1 | 0.07 | 0.25 | 0 |
| Methane | 88.7 | 88.5 | 85.3 | 87.1 | 77.5 | 91.2 | 25.3 | 76.3 | 4.9 |
| Ethane | 5.6 | 5.7 | 7.5 | 7.3 | 11.7 | 5.4 | 14.0 | 15.5 | 13.4 |
| Propane | 3.1 | 3.1 | 4.4 | 3.7 | 7.5 | 2.1 | 27.1 | 6.7 | 35.3 |
| I-Butane | 0.31 | 0.31 | 0.49 | 0.33 | 0.93 | 0.07 | 6.1 | 0.44 | 8.3 |
| N-Butane | 0.72 | 0.72 | 0.97 | 0.56 | 1.6 | 0.12 | 15.1 | 0.66 | 20.9 |
| Cyclo-Pentane | 0.02 | 0.02 | 0.02 | 0 | 0.01 | 0 | 0.55 | 0 | 0.77 |
| i-Pentane | 0.11 | 0.11 | 0.11 | 0.04 | 0.10 | 0.01 | 2.6 | 0.03 | 3.6 |
| n-Pentane | 0.06 | 0.06 | 0.06 | 0.02 | 0.04 | 0 | 1.5 | 0.01 | 2.1 |
| Cyclo-Hexane | 0.02 | 0.02 | 0.01 | 0 | 0 | 0 | 0.39 | 0 | 0.54 |
| n-Hexane | 0.08 | 0.08 | 0.06 | 0 | 0.02 | 0 | 1.9 | 0 | 2.7 |
| Benzene | 0.05 | 0.05 | 0.04 | 0 | 0.01 | 0 | 1.2 | 0 | 1.6 |
| n-Heptane | 0.09 | 0.09 | 0.06 | 0 | 0 | 0 | 2.1 | 0 | 3.0 |
| n-Octane | 0.09 | 0.09 | 0.06 | 0 | 0 | 0 | 2.1 | 0 | 3.0 |
| Molar Flow (kmol/h) | 1,160 | 1,174 | 1,657 | 1,610 | 483 | 1,127 | 46.8 | 13.3 | 33.5 |
| Temp. (° C.) | 40 | 40 | −20 | 30 | 15 | 22 | −20 | −40 | −40 |
| Pressure (bar) | 34.5 | 41.4 | 39.3 | 39.3 | 38.6 | 6.9 | 39.3 | 6.9 | 6.9 |

Table 5 compares the conventional (compress and condense) system shown in FIG. 9 to the retrofitted system shown in FIG. 7.

TABLE 5

Conventional Liquids Recovery System Compared to Retrofitted System of the Invention

| | Conventional | Retrofitted | % Change |
|---|---|---|---|
| Feed gas (MMscfd) | 10 | 10 | — |
| Gas to flare (MMscfd) | 9.88 | 9.71 | −1.7 |
| Recovered liquids (bpd) | 98.3 | 219.4 | +123 |
| Refrigeration to −20° C. (MMBtu/h) | 1.49 | 2.20 | +48 |
| Compression (hp) | 1,390 | 1,400 | +0.7 |

The simple retrofit more than doubles the amount of liquids recovered, for a 48% increase in refrigeration required.

We claim:

1. A gas separation process, comprising:
   (a) providing an ejector including a motive gas inlet, a suction gas inlet, and a mixed gas outlet;
   (b) passing to the motive gas inlet a motive gas comprising a gas mixture that includes at least a first gas component and a second gas component that is different from the first gas component;
   (c) passing a suction gas to the suction gas inlet;
   (d) withdrawing from the mixed gas outlet a mixed gas comprising the motive gas and the suction gas;
   (e) providing a first membrane having a first feed side and a first permeate side, wherein the first membrane is selective to the first gas component relative to the second gas component;
   (f) passing the mixed gas across the first feed side;
   (g) withdrawing from the first permeate side a first permeate stream that is enriched in the first gas component relative to the mixed gas;
   (h) withdrawing from the first feed side a first residue stream that is depleted in the first gas component relative to the mixed gas;
   (i) providing a second membrane having a second feed side and a second permeate side, wherein the second membrane is selective to the second gas component relative to the first gas component;
   (j) passing the first residue stream across the second feed side;
   (k) withdrawing from the second permeate side a second permeate stream that is enriched in the second gas component relative to the first residue stream;
   (l) withdrawing from the second feed side a second residue stream that is depleted in the second gas component relative to the first residue stream; and
   (m) passing at least a portion of the second residue stream back to the ejector as the suction gas.

* * * * *